United States Patent
Parks et al.

(10) Patent No.: US 8,204,978 B2
(45) Date of Patent: Jun. 19, 2012

(54) CLIENT-SIDE AUTO-REDISCOVERY FOR NETWORKED DEVICES

(75) Inventors: Peter Parks, Vancouver, WA (US); John Van Boxtel, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1788 days.

(21) Appl. No.: 10/774,934

(22) Filed: Feb. 9, 2004

(65) Prior Publication Data
US 2005/0198267 A1  Sep. 8, 2005

(51) Int. Cl.
*G06F 15/173* (2006.01)
(52) U.S. Cl. ........................ 709/224; 709/225
(58) Field of Classification Search ........... 709/224–228
See application file for complete search history.

(56) References Cited

U.S. PATENT DOCUMENTS

| | | | | |
|---|---|---|---|---|
| 5,185,860 A * | 2/1993 | Wu | | 709/224 |
| 6,496,859 B2 * | 12/2002 | Roy et al. | | 709/223 |
| 6,636,499 B1 * | 10/2003 | Dowling | | 370/338 |
| 6,654,796 B1 * | 11/2003 | Slater et al. | | 709/220 |
| 6,982,953 B1 * | 1/2006 | Swales | | 370/218 |
| 7,536,450 B2 * | 5/2009 | Motoyama et al. | | 709/223 |
| 7,668,123 B1 * | 2/2010 | Scott et al. | | 370/310 |
| 2002/0049809 A1 * | 4/2002 | Moetteli | | 709/203 |
| 2002/0062366 A1 * | 5/2002 | Roy et al. | | 709/224 |
| 2002/0075809 A1 * | 6/2002 | Phaal | | 370/224 |
| 2002/0103888 A1 * | 8/2002 | Janz et al. | | 709/223 |
| 2005/0190752 A1 * | 9/2005 | Chiou et al. | | 370/360 |

* cited by examiner

*Primary Examiner* — Krisna Lim

(57) ABSTRACT

Methodology, systems, and media associated with client-side auto-rediscovery for networked devices are described. One exemplary method may include discovering a connection to a service providing networked device, client-side associating the connection, validating the connection before initiating a service request to the service providing networked device, selectively rediscovering the service providing networked device, and selectively client-side reassociating the connection.

35 Claims, 11 Drawing Sheets

800

With a data store associated with a service requesting networked device, store a pairing data that relates the service requesting networked device and a service providing networked device
(block 802)

With a logic associated with said service requesting networked device, in response to said service requesting device send a service request to said services providing network device, determine whether the pairing data should be updated and to update the pairing data if said pairing data is not valid
(block 804)

With a data store, store an Internet protocol (IP) address and a MAC address associated with a service providing networked device that is configured to provide a service to a requesting networked device, the data store being located in the requesting networked device
(block 902)

With a first logic, in response to a service request made by said requesting networked device, produce a uni-cast SNMP GET request for the MAC address of the service providing networked device and to determine whether the IP address and MAC address stored in the data store describe a valid pairing based on a uni-cast SNMP GET RESPONSE message, the first logic being located in the requesting networked device
(block 904)

With a second logic, selectively produce a multicast SNMP GET request for the MAC address of one or more service providing networked devices related to said service request and to selectively update the data store based on one or more uni-cast SNMP GET RESPONSE messages responsive to the multicast SNMP GET request, the second logic being located in the requesting networked device
(block 906)

Fig. 9

CLIENT-SIDE AUTO-REDISCOVERY FOR NETWORKED DEVICES

BACKGROUND

Devices that can be employed with a network may be configured with static, uniquely identifying hardware data like a media access control (MAC) address. While associated with a network, a networked device may also be configured with dynamic and/or static, identifying and/or addressing data like an Internet Protocol (IP) address.

One networked device may "discover" another networked device by examining data like the static, uniquely identifying hardware data and the dynamic identifying and/or addressing data. This discovery may be, for example, a user-driven discovery process where a user provides information about the name, type, location, capabilities, attributes, address and so on of a device that it would like to discover. For example, a user may interact with a user interface to specify parameters associated with a printer that the user would like to have available to their computer.

But, the discovery may become out-dated. Information associated with the discovery, like the dynamic IP address may become stale, get out of date, or otherwise become inaccurate. Conventionally, this may force a user to repeatedly perform the manual discovery process.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 8 is a flowchart showing an illustrative method performed by a client-side auto-rediscovery system, according to one example of principles described herein.

FIG. 9 is a flowchart showing an illustrative method performed by a client-side auto-rediscovery system, according to one example of principles described herein.

DETAILED DESCRIPTION

Figure 1:
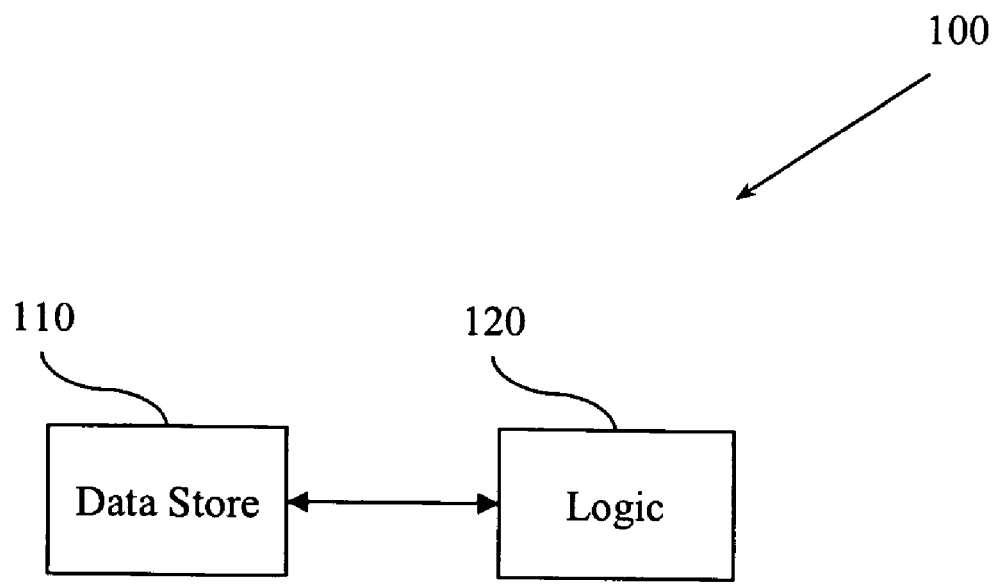
FIG. 1 illustrates an example client-side auto-rediscovery system.

This application describes example systems, methods, and computer-readable mediums associated with client-side auto-rediscovery for networked devices. A networked device like a computer may initially discover another networked device using well-known techniques like user-driven discovery. The discovering networked device may be, for example, a computer that will request a service. The discovered networked device may be, for example, a printer that will provide the service. The discovering networked device, having performed the work to discover the discovered networked device may store information about the discovered networked device. The information stored may be, for example, binding information like an IP address and a MAC address associated with the discovered device. The information may be stored, for example, in a pairing table that is stored in a memory, a register, a file, a logic, and so on. While a computer and a printer, an IP address and a MAC address, a pairing table, and a memory and so on are described, it is to be appreciated that other networked devices, binding data, data structures, and data stores may be associated with client-side auto-rediscovery for networked devices.

In a networked environment, the binding data may become invalid. For example, events like a network going down, a subnet going down, a device being turned on and/or off, a device being re-booted, a dynamic IP address (re)allocation occurring, and so on can lead to a stored binding data (e.g., IP address) losing its validity. Thus, periodically and/or when a service requesting device makes a request for a service, the service requesting device may check that the stored binding data is valid (e.g., the service providing device is still where the service requesting device thinks it is). If the stored binding data is valid, the request can continue. But if the stored binding data is invalid, then the requesting device may try to "rediscover" the service-providing device. If the service-providing device is rediscovered by the service requesting device, then the service requesting device may update its stored binding data (e.g., IP address) and then proceed with the request. But, if the service providing device is not rediscovered, then the service requesting device may take some other action like presenting an error message, generating an error signal, making a service request to a different service provider, and so on.

In one example, an input/output module (IOM) in a device driver (e.g., printer driver) may produce a customized user datagram protocol (UDP) packet that is sent via a broadcast and/or multicast message to devices that are registered and listening on the network. A device(s) may respond to the customized UDP packet with a specific response packet containing the requested data (e.g., MAC address) via a uni-cast message. In one example, the IOM may analyze information contained in the return packet like a uni-cast IP address of the responding device and the MAC address. Using the uni-cast IP address, the IOM may then send a simple network management protocol (SNMP) GET request for unique hardware identifying information like a MAC address.

The IOM may then examine the message(s) returned in response to the SNMP GET request to determine if a device matches the previously paired binding data (e.g., MAC address). If a device matches, then the IOM may refresh the binding data and re-associate the service-providing device with the service requesting device.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory, and so on.

Common forms of a computer-readable medium include, but are not limited to, an application specific integrated circuit (ASIC), a compact disc (CD), a digital video disk (DVD), a random access memory (RAM), a read only memory (ROM), a programmable read only memory (PROM), an electronically erasable programmable read only memory (EEPROM), a disk, a memory stick, a floppy disk, a flexible disk, a hard disk, a magnetic tape, other magnetic media, a CD-ROM, other optical media, punch cards, paper tape, other physical media with patterns of holes, an electrically programmable ROM (EPROM), a FLASH-EPROM, or other memory chip or card, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another component. For example, based on a desired application or needs, logic may include a software-controlled microprocessor, discrete logic like an ASIC, a programmed logic device, a memory device containing instructions, or the like. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal", as used herein includes, but is not limited to, one or more electrical or optical signals, analog or digital, one or more computer or processor instructions, messages, a bit or bit stream, or other means that can be received, transmitted and/or detected.

An "operable connection", or a connection by which entities are "operably connected", is one in which signals, physical communication flow, and/or logical communication flow may be sent and/or received directly and/or indirectly between entities like logics, processes, and so on. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, characterizing, or the like, refer to actions and processes of a computer system, logic, processor, or similar electronic device that manipulates and transforms data represented as physical (electronic) quantities.

FIG. 1 illustrates a system 100 that includes a data store 110 configured to store a pairing data that relates a service requesting networked device and a service providing networked device. In one example the data store 110 may be a file like an extensible markup language (XML) file. In another example, the data store 110 may be a computer hardware component like a register or a memory. The service requesting networked device may be, for example, a computer, a printer, a scanner, and so on. Similarly, the service providing networked device may be, for example, a computer, a printer, a scanner, and so on. The pairing data may be, for example, an IP address that is related to a unique hardware identifier, a unique software identifier, a virtual identifier, a dynamic identifier, and so on. The unique hardware identifier may be, for example, a MAC address, a globally unique identifier (GUID), an object identifier (OID), an IP address, a virtual name, and so on. The pairing data may be stored, for example, as a record, a table entry, a tuple, and so on.

The system 100 may also include a logic 120 that is configured to perform rediscovery actions like determining whether the pairing data should be updated and selectively updating the pairing data. The logic 120 may be configured to generate a uni-cast SNMP GET message that is delivered from the service requesting networked device to the service providing networked device. The SNMP GET message may be configured to request a binding data that facilitates determining whether to update the pairing data. The logic 120 may be further configured to generate a multicast SNMP GET message to be delivered to service providing networked devices. The SNMP GET message may be configured to request a binding data that facilitates updating the pairing data. The binding data may include, for example, a MAC address, a GUID, an OID, an IP address, a virtual name, and the like.

Thus, the system 100 may facilitate discovering a connection between, for example, a computer and a printer. Data concerning the connection may be stored in the data store 110. Then, when the computer wants to print something on the printer, the logic 120 may validate that the data in the data store 110 is current and valid, and that the printer can be located at its previously discovered location. If the connection, as represented in the data, is not valid, then the logic 120 may try to rediscover the printer and update the data in the data store 110 if successful. If not successful, the logic 120 may generate an error signal, try a different printer, and so on.

Figure 2:
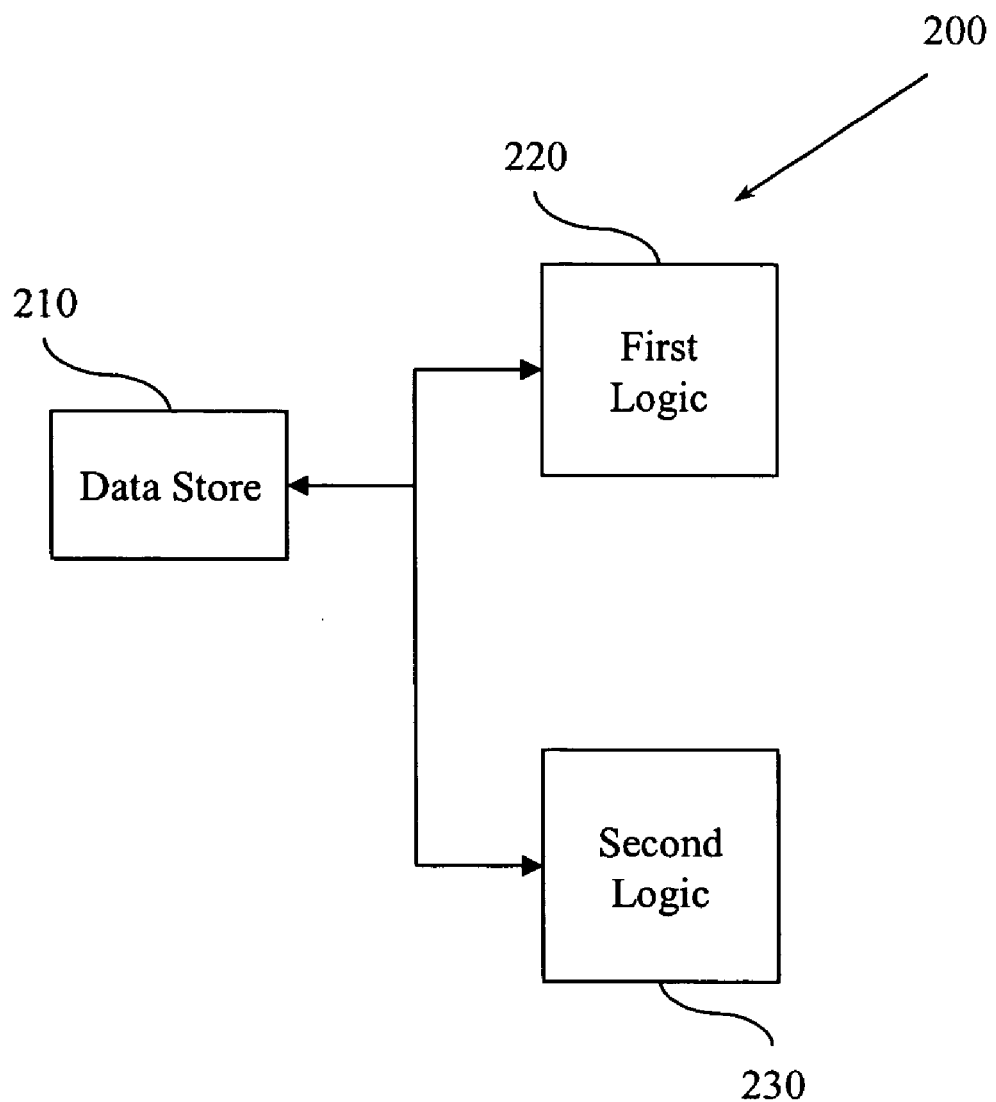
FIG. 2 illustrates another example client-side auto-rediscovery system.

FIG. 2 illustrates an example system 200 that includes a data store 210 configured to store an IP address and a MAC address associated with a service providing networked device. The service providing network device may be configured to provide a service to a service requesting networked device. For example, a printer may be configured to provide a print service for a computer. In one example, the data store 210 may be located in the service requesting networked device. In another example, the data store 210 may be an XML file.

The system 200 may also include a first logic 220 that is configured to produce a uni-cast SNMP GET request for the MAC address of the service providing networked device. The first logic 220 may generate the unicast SNMP GET message when the service requesting networked device makes a request for a service from the service providing networked device. The first logic 220 may also be configured to determine whether the IP address and MAC address stored in the data store 210 describe a valid pairing based on a uni-cast SNMP GET RESPONSE message. In one example, the first logic 220 is located in the service requesting networked device. In another example, the unicast message may be an SLP message.

The system 200 may also include a second logic 230 that is configured to selectively produce a multicast SNMP GET request for the MAC address of a service providing networked device(s) based, at least in part, on the result of processing performed by the first logic 220. The second logic 230 may also be configured to selectively update the data store 210 based, for example, on a uni-cast SNMP GET RESPONSE message(s) received in response to the SNMP GET request. In one example, the second logic 230 is located in the service requesting networked device.

Figure 3:
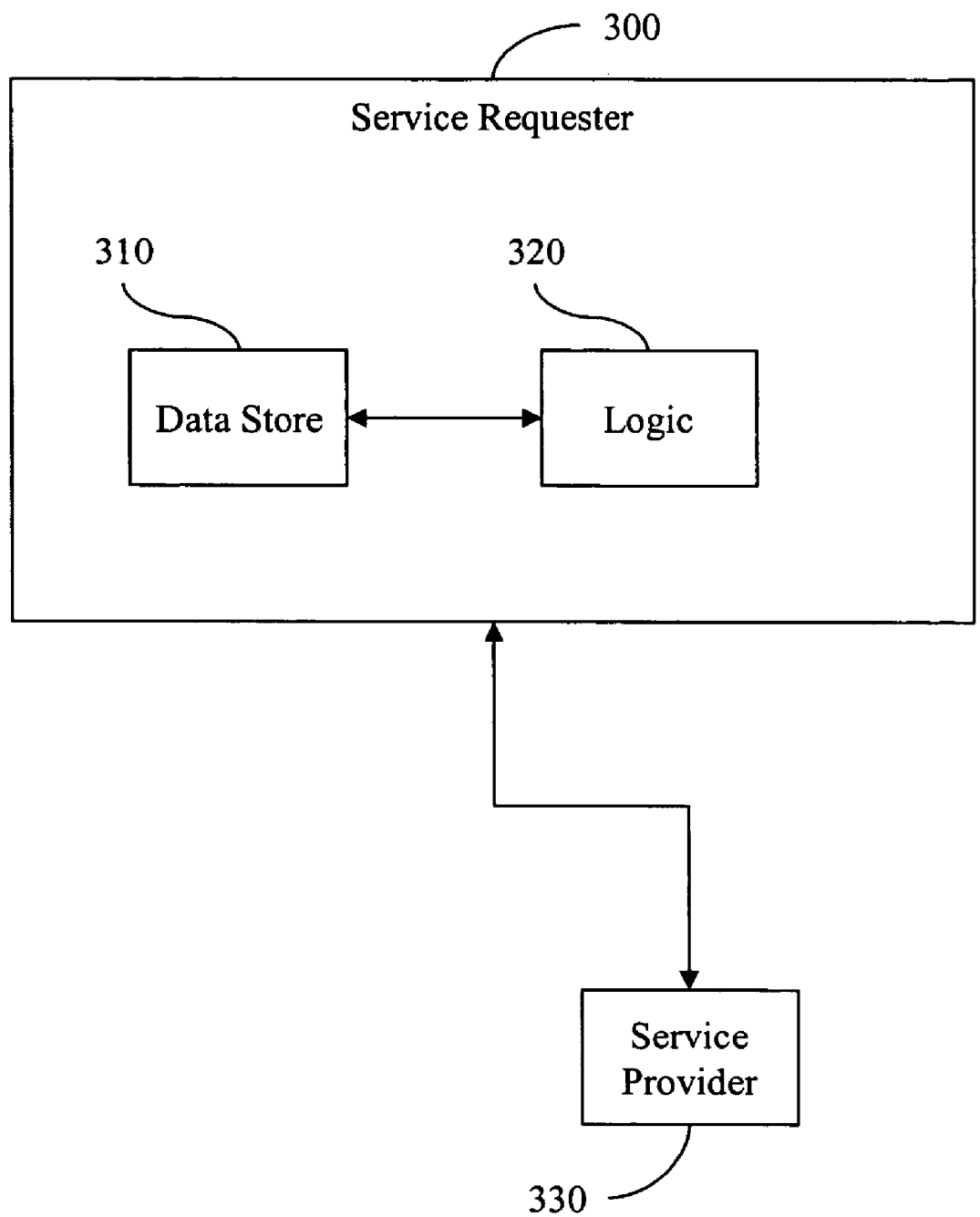
FIG. 3 illustrates an example system in which client-side auto-rediscovery may occur.

FIG. 3 illustrates an example service requester 300 that includes a data store 310 and a logic 320. The logic 320 may be programmed to perform a method that includes determining, on a per service request basis, whether to perform a rediscovery process on behalf of the service requester. The process can include requesting a MAC address from a service provider 330. The MAC address may facilitate binding the service requester 300 and the service provider 330. The process may also include selectively requesting a MAC address from a networked device(s). The MAC address may facilitate re-binding the service requester 300 and the service provider 330. The request may be transmitted in an SNMP GET message via a multicast mode, a broadcast mode, and so on. The process may also include receiving the MAC address in a uni-cast SNMP GET RESPONSE message and selectively updating an IP address, MAC address pair based on the MAC address in the SNMP GET RESPONSE message.

Thus, the service requester 300 may include means like data store 310 for storing a pairing data that relates the service requesting networked device 300 and the service providing networked device 330. Similarly, the service requester 300 may include means like logic 320 for doing weak discovery between the service requesting networked device 300 and the service providing networked device 330. Weak discovery may include, for example, sending broadcast and/or multicast messages out onto a network to discover the service providing networked device 330. The service requester 300 may also include means like logic 320 for selectively automatically performing strong discovery to rediscover the service providing networked device 330. Strong discovery may include, for example, sending uni-cast messages with requests for specific binding data to a specific device like the service providing networked device 330.

Figure 4:
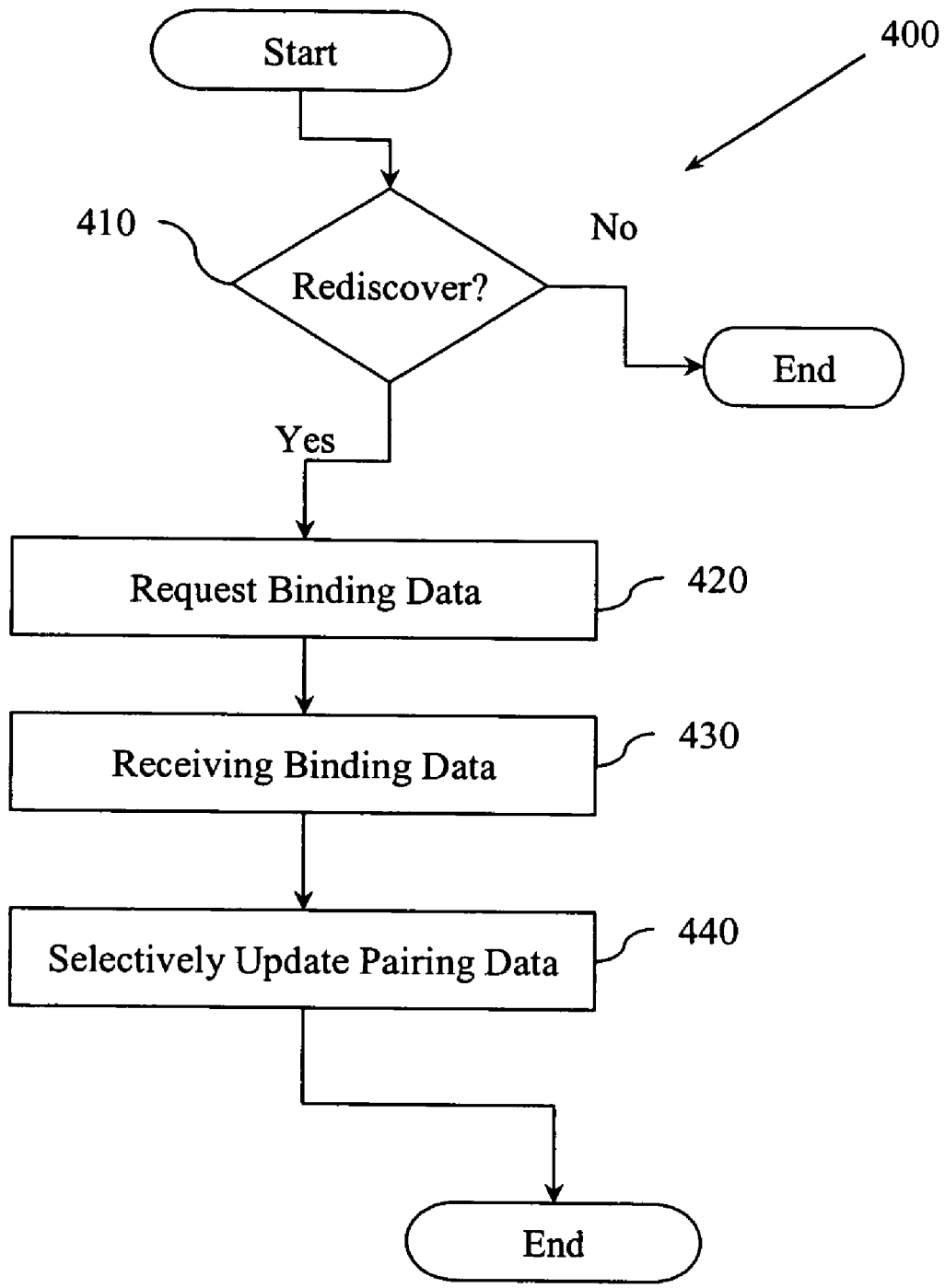
FIG. 4 illustrates an example method for client-side auto-rediscovery.
Figure 5:
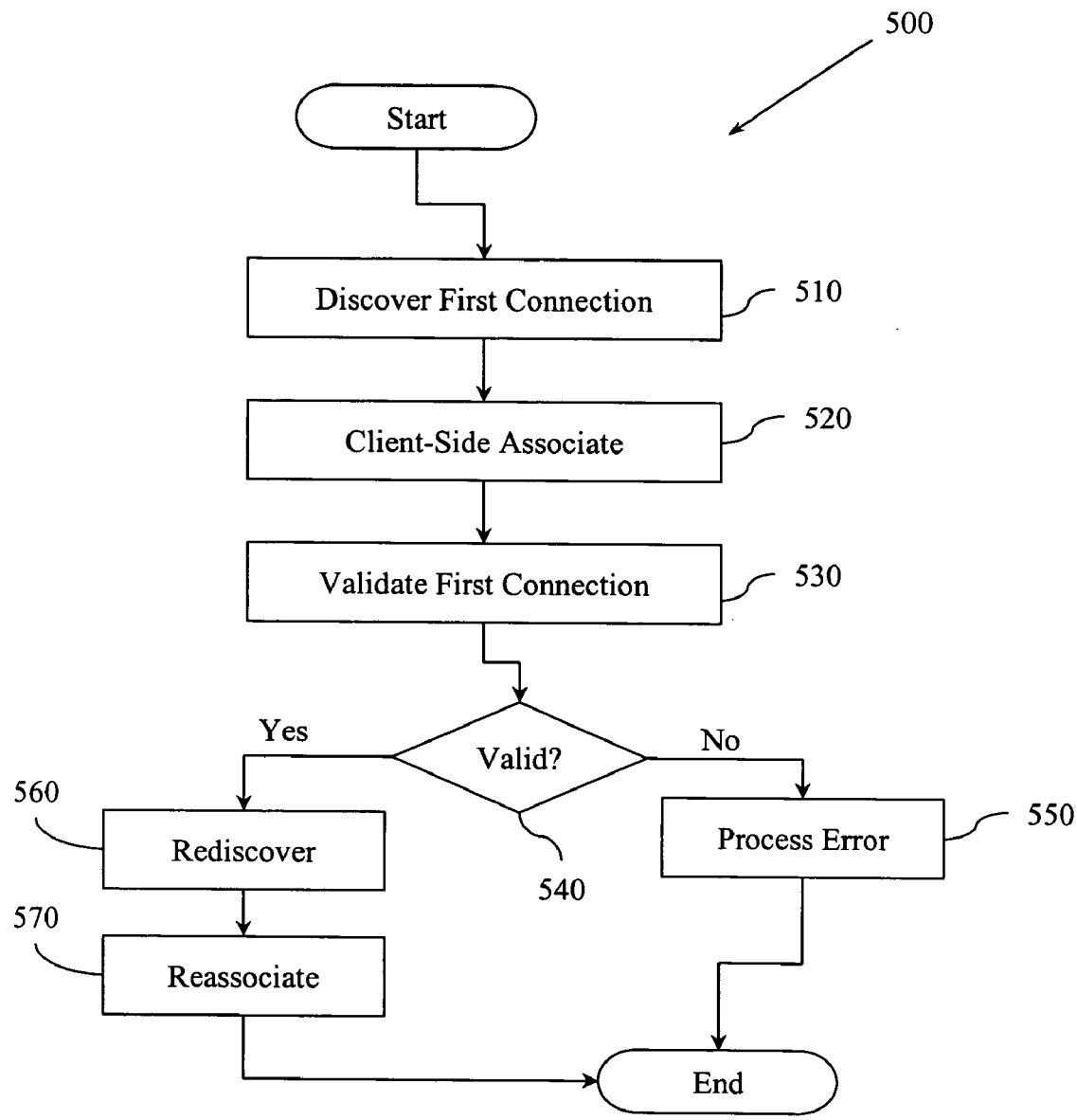
FIG. 5 illustrates another example method for client-side auto-rediscovery.

Example methods may be better appreciated with reference to the flow diagrams of FIG. 4 and FIG. 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In one example, methodologies are implemented as processor executable instructions and/or operations stored on a computer-readable medium.

In the flow diagrams, blocks denote "processing blocks" that may be implemented, for example, in software. Additionally and/or alternatively, the processing blocks may represent functions and/or actions performed by functionally equivalent circuits like a digital signal processor (DSP), an ASIC, and the like.

A flow diagram does not depict syntax for any particular programming language, methodology, or style (e.g., procedural, object-oriented). Rather, a flow diagram illustrates functional information one skilled in the art may employ to fabricate a logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 4 illustrates an example auto-rediscovery method 400. The method 400 may include, at 410, determining whether to perform a process that facilitates relating a first networked device and a second networked device. Determining whether to perform a process may occur periodically, when the first networked device requests a service from the second networked device, and so on. Determining whether to perform the process can include, for example, requesting binding data from the second networked device via a uni-cast message (e.g., uni-cast SNMP GET message). If the second networked device responds with the requested data, then a connection to the second networked device is likely still valid and thus rediscovery may not be performed. However, if there is no response to the request for the binding data, then the connection may no longer be valid and rediscovery may be performed. If the determination at 410 is No, then processing may conclude. But if the determination at 410 is Yes, then processing can continue at 420.

Thus the method 400 may include, at 420, selectively requesting a binding data that facilitates uniquely identifying a networked device. The binding data may include, for example, a MAC address, an OID, a GUID, an IP address, a virtual name, and the like. The request may be sent, for example, to a variety of networked service providers like printers, scanners, servers, and so on. The binding data may be requested, for example, in a broadcast message, a multicast message, a uni-cast message, and the like. The broadcast, multicast and/or uni-cast message may be, for example, an SNMP GET message.

The method 400 may also include, at 430, receiving binding data in a response message. The response message may be received in response to requesting the binding data at 420. The response message may be, for example, a uni-cast SNMP GET RESPONSE message. The binding data may include, for example, a MAC address, an OID, a GUID, a uni-cast IP address, a virtual name, and so on. If desired binding data is not received in a response message, then there may be no current connection between the first networked device and the second networked device.

The method 400 may also include, at 440, selectively updating a pairing data that relates (e.g., binds) the first networked device and the second networked device. The pairing data may be based, at least in part, on the binding data. For example, the pairing data may include entries including, but not limited to, an IP address, a MAC address pair, an OID pair, a GUID, a unique hardware identifier, a unique software identifier, a virtual identifier, and a dynamic identifier, and so on. In one example, the method 400 may be performed by a device driver. The virtual identifier may be, for example, a virtual name. The dynamic identifier may be, for example, a dynamic IP address.

While FIG. 4 illustrates various actions occurring in serial, it is to be appreciated that various actions illustrated in FIG. 4 could occur substantially in parallel. By way of illustration, a first process could determine whether and/or when to perform rediscovery. Similarly, a second process could request and receive binding data while a third process could selectively update pairing data based on the binding data. While three processes are described, it is to be appreciated that a greater and/or lesser number of processes could be employed and that lightweight processes, regular processes, threads, and other approaches could be employed.

In one example, a computer-readable medium may store processor executable instructions operable to perform an auto-rediscovery method. The method may include, for example, determining whether to perform a process that facilitates relating a first networked device and a second networked device and selectively requesting binding data that facilitates uniquely identifying a networked device. The method may also include receiving, in response to requesting binding data, a message that includes binding data. The method may also include selectively updating a pairing data that relates the first networked device and the second networked device based, at least in part, on the binding data.

FIG. 5 illustrates an example method 500 for performing auto-rediscovery. The method 500 may include, at 510, discovering a first connection to a service providing networked device. The service providing networked device may be, for example, a scanner. Discovering the first connection may include, for example, sending a broadcast message, a multicast message, and the like by an SNMP message, an SLP message and so on to service providing networked devices. If a connection to a desired service providing networked device is found, then information about the connection may be stored in the service requesting networked device.

Thus, the method 500 may also include, at 520, client-side associating a stored connection between the service requesting networked device and the service providing networked device. The client-side associating can be based, at least in part, on data concerning the first connection. Client-side associating the stored connection can include, for example, storing a unique hardware identifier and a uni-cast IP address associated with the service providing networked device, where the identifier/address pair are discovered at 510. The identifier/address pair may be extracted, for example, from a uni-cast response message sent from the service providing networked device to the service requesting networked device.

When the service requesting networked device makes a request for service from the service providing networked device, the method 500 may include, at 530, validating the stored connection to the service providing networked device. Validating the stored connection to the service providing networked device may include sending a uni-cast SNMP GET message to the service providing networked device. The uni-cast SNMP GET message may request information that can be compared, for example, to a client-side association. If the desired information is not received, then the connection may no longer be valid.

The method 500 may also include, at 540, making a determination whether the stored connection and/or a client-side association concerning the stored connection is valid. If the determination is No, then at 550, the method 500 may include processing an error condition. For example, an error signal may be generated, an error message may be displayed to a user, an interrupt may be generated, a different service providing networked device may be selected, and so on. But if the determination at 540 is Yes, then the method 500 may include, at 560, selectively re-discovering a second connection to the service providing networked device and, at 570, selectively client-side re-associating the connection between the service requesting networked device and the service providing networked device based, at least in part, on information related to the second connection. In one example, selectively re-discovering the second connection may include sending an SNMP and/or SLP broadcast and/or multicast message to service providing networked devices. The second connection may be considered re-discovered when, for example, a desired value for a requested data (e.g., MAC address) is located in a response message. For example, as messages responsive to the broadcast and/or multicast message are received, data the responsive messages carry can be compared to stored pairing and/or binding data to facilitate identifying a response message generated by the previously discovered service providing networked device.

While FIG. 5 illustrates various actions occurring in serial, it is to be appreciated that various actions illustrated in FIG. 5 could occur substantially in parallel. By way of illustration, a first process could facilitate initial discoveries and client-side associations while a second process could facilitate re-discovery and re-association. While two processes are described, it is to be appreciated that a greater and/or lesser number of processes could be employed and that lightweight processes, regular processes, threads, and other approaches could be employed.

Figure 6:
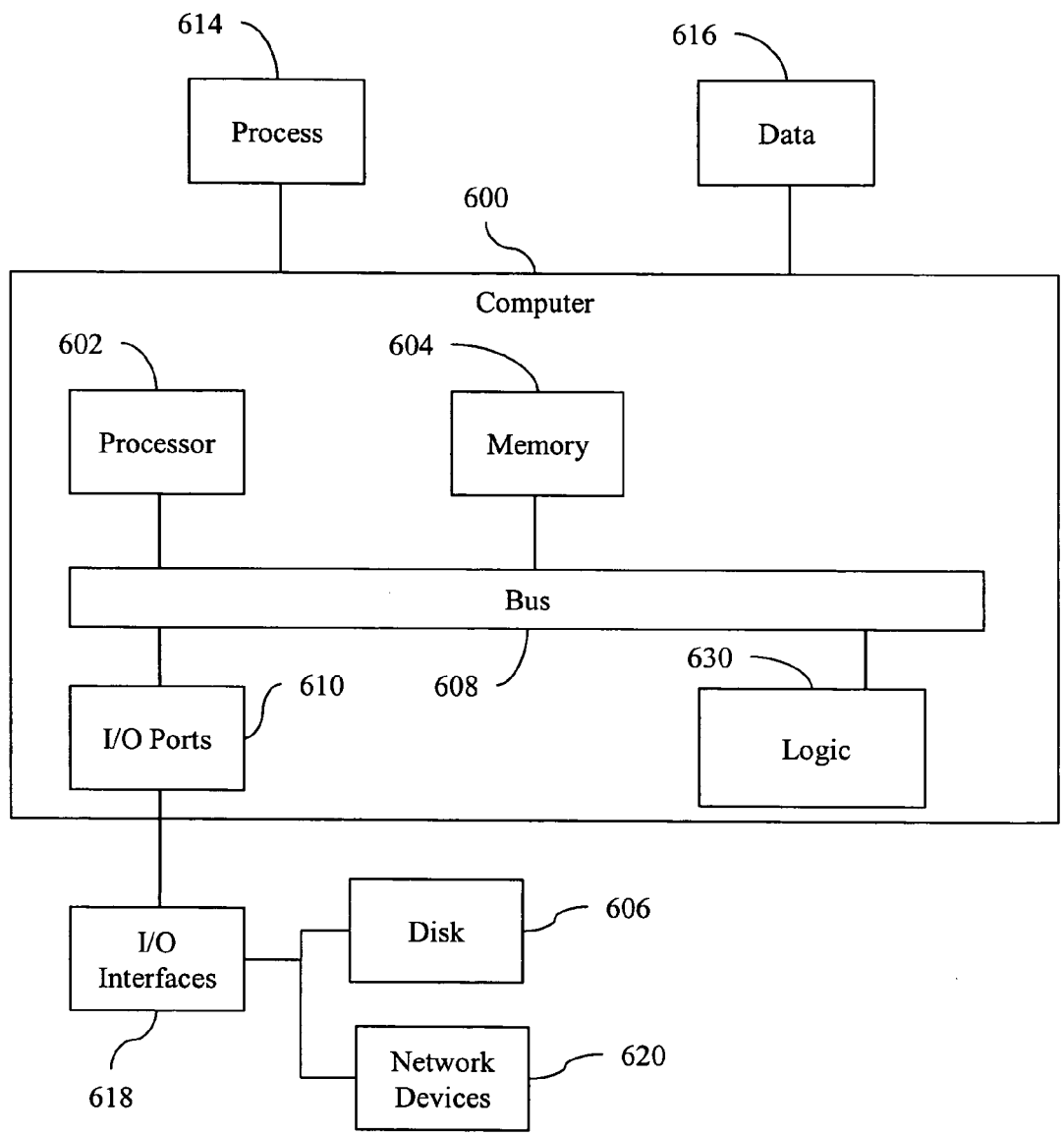
FIG. 6 illustrates an example computing environment with which client-side auto-rediscovery may be associated.

FIG. 6 illustrates a computer 600 that includes a processor 602, a memory 604, and input/output ports 610 operably connected by a bus 608. In one example, the computer 600 may include a logic 630 configured to facilitate (re)establishing and/or maintaining a logical connection between a service requesting networked device (e.g., computer 600) and a service providing networked device (e.g., image forming device 700, FIG. 7).

The processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, USB ports FireWire, Wireless (e.g., 802.11a/b/g, 802.15.1), Ethernet, and so on.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 620 can connect to WAN technologies including, but not limited to, point to point links, circuit switching networks like integrated services digital networks (ISDN), packet switching networks, and digital subscriber lines (DSL).

Figure 7:
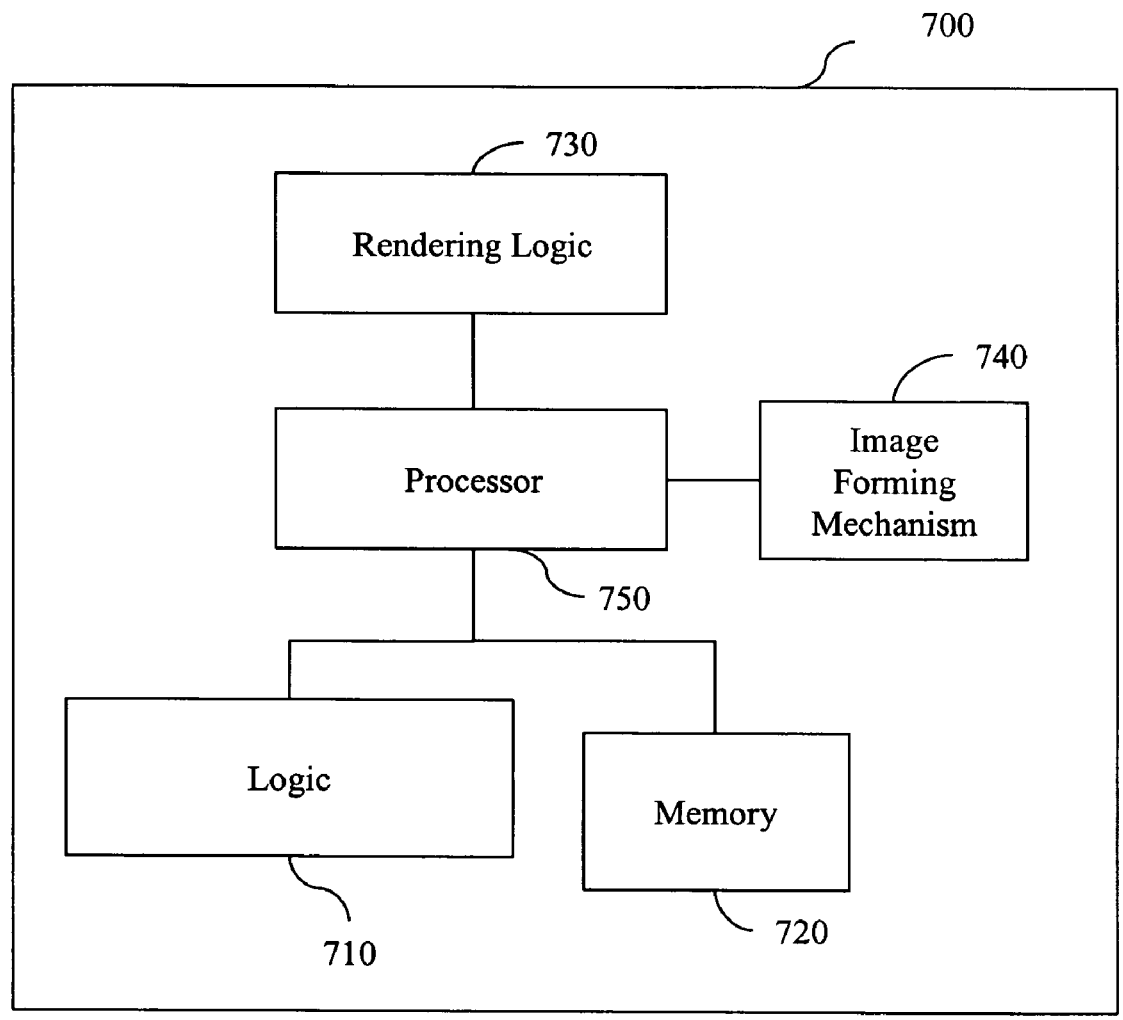
FIG. 7 illustrates an example image forming device with which client-side auto-rediscovery may be associated.

FIG. 7 illustrates an example image forming device 700 in which an example logic 710 may be located. While the processing performed by the logic 710 may often be performed at, for example, computer 600, a device like image forming device 700 may itself be a networked device that requests services. For example, if image forming device 700 receives a print request that can be more easily, timely, and/or cost effectively handled by a related printer, then image forming device 700 may pass on the print request after employing logic 710 to validate and/or rediscover the service providing device.

The image forming device 700 may include a memory 720 configured to store print data, for example, or to be used more generally for image processing. The image forming device 700 may receive print data to be rendered. Thus, the image forming device 700 may include a rendering logic 730 configured to generate a printer-ready image from print data. Rendering varies based on the format of the data involved and the type of imaging device. In general, the rendering logic 730 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 700 may receive printer-ready data that does not need to be rendered and thus the rendering logic 730 may not appear in some image forming devices.

The image forming device 700 may also include an image forming mechanism 740 configured to generate an image onto print media from the print-ready image. The image forming mechanism 740 may vary based on the type of the imaging device 700 and may include a laser imaging mechanism, other toner-based imaging mechanisms, an ink jet mechanism, digital imaging mechanism, or other imaging reproduction engine.

A processor 750 may be included that is implemented with logic to control the operation of the image-forming device 700. In one example, the processor 750 includes logic that is capable of executing Java instructions. Other components of the image forming device 700 are not described herein but may include media handling and storage mechanisms, sensors, controllers, and other components involved in the imaging process.

FIG. 8 is a flowchart showing an illustrative method (800) performed by a client-side auto-rediscovery system. According to certain illustrative examples, the method (800) includes With a data store associated with a service requesting networked device, storing (block 802) a pairing data that relates the service requesting networked device and a service providing networked device, and with a logic associated with said service requesting networked device, in response to said service requesting device send a service request to said services providing network device, determining (block 804) whether the pairing data should be updated and to update the pairing data if said pairing data is not valid.

FIG. 9 is a flowchart showing an illustrative method (900) performed by a client-side auto-rediscovery system, according to certain illustrative examples, the method (900) includes, with a data store, storing (block 902) an Internet protocol (IP) address and a MAC address associated with a service providing networked device that is configured to provide a service to a requesting networked device, the data store being located in the requesting networked device, with a first logic, in response to a service request made by said requesting networked device, producing (block 904) a uni-cast SNMP GET request for the MAC address of the service providing networked device and to determine whether the IP address and MAC address stored in the data store describe a valid pairing based on a uni-cast SNMP GET RESPONSE message, the first logic being located in the requesting networked device, and with a second logic, selectively producing (block 906) a multicast SNMP GET request for the MAC address of one or more service providing networked devices related to said service request and to selectively update the data store based on one or more uni-cast SNMP GET RESPONSE messages responsive to the multicast SNMP GET request, the second logic being located in the requesting networked device.

Figure 10:
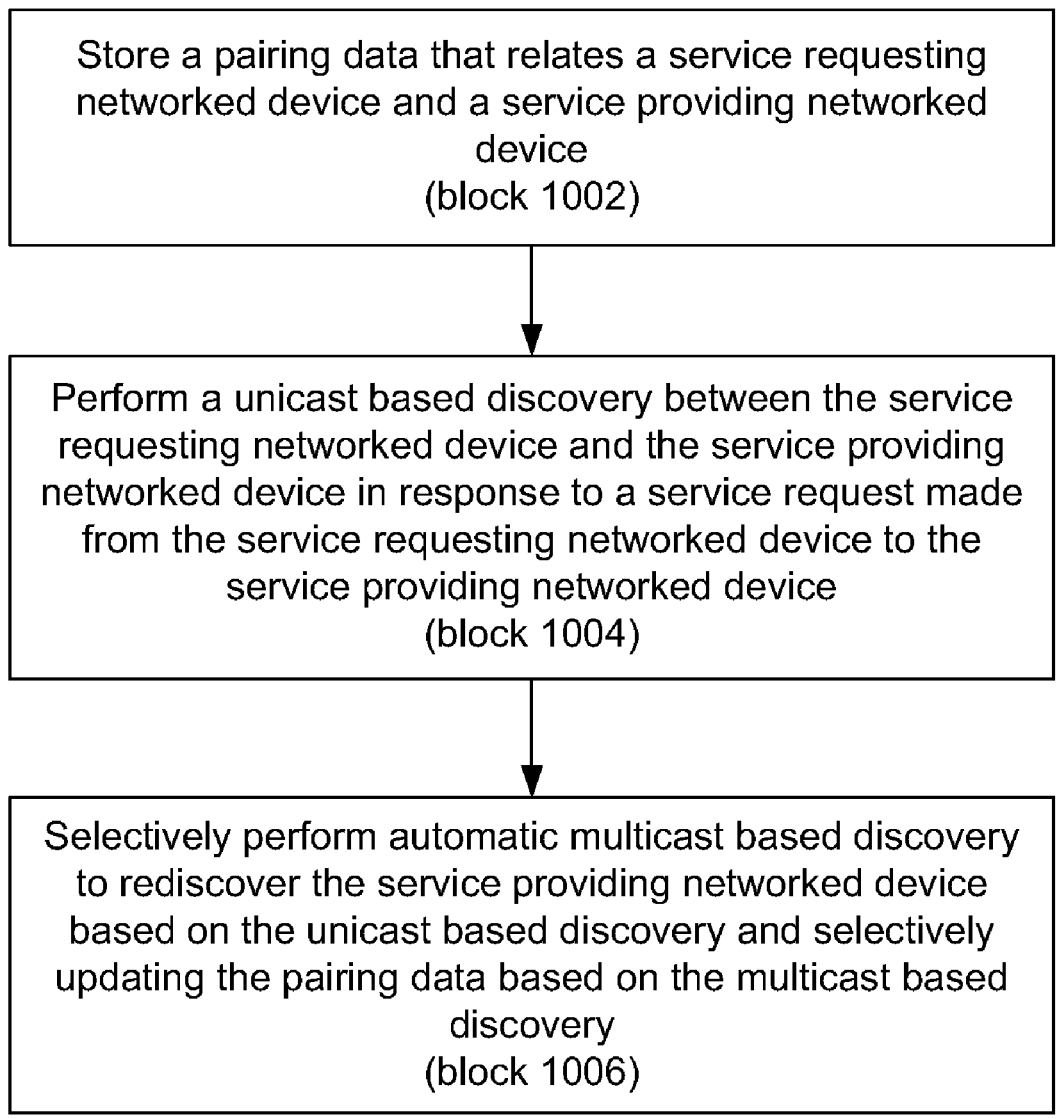
FIG. 10 is a flowchart showing an illustrative method performed by a client-side auto-rediscovery system, according to one example of principles described herein.

FIG. 10 is a flowchart showing an illustrative method (1000) performed by a client-side auto-rediscovery system, according certain illustrative examples, the method (1000)

includes storing (block 1002) a pairing data that relates a service requesting networked device and a service providing networked device, performing (block 1004) a unicast based discovery between the service requesting networked device and the service providing networked device in response to a service request made from the service requesting networked device to the service providing networked device, and selectively performing (block 1006) automatic multicast based discovery to rediscover the service providing networked device based on the unicast based discovery and selectively updating the pairing data based on the multicast based discovery.

Figure 11:
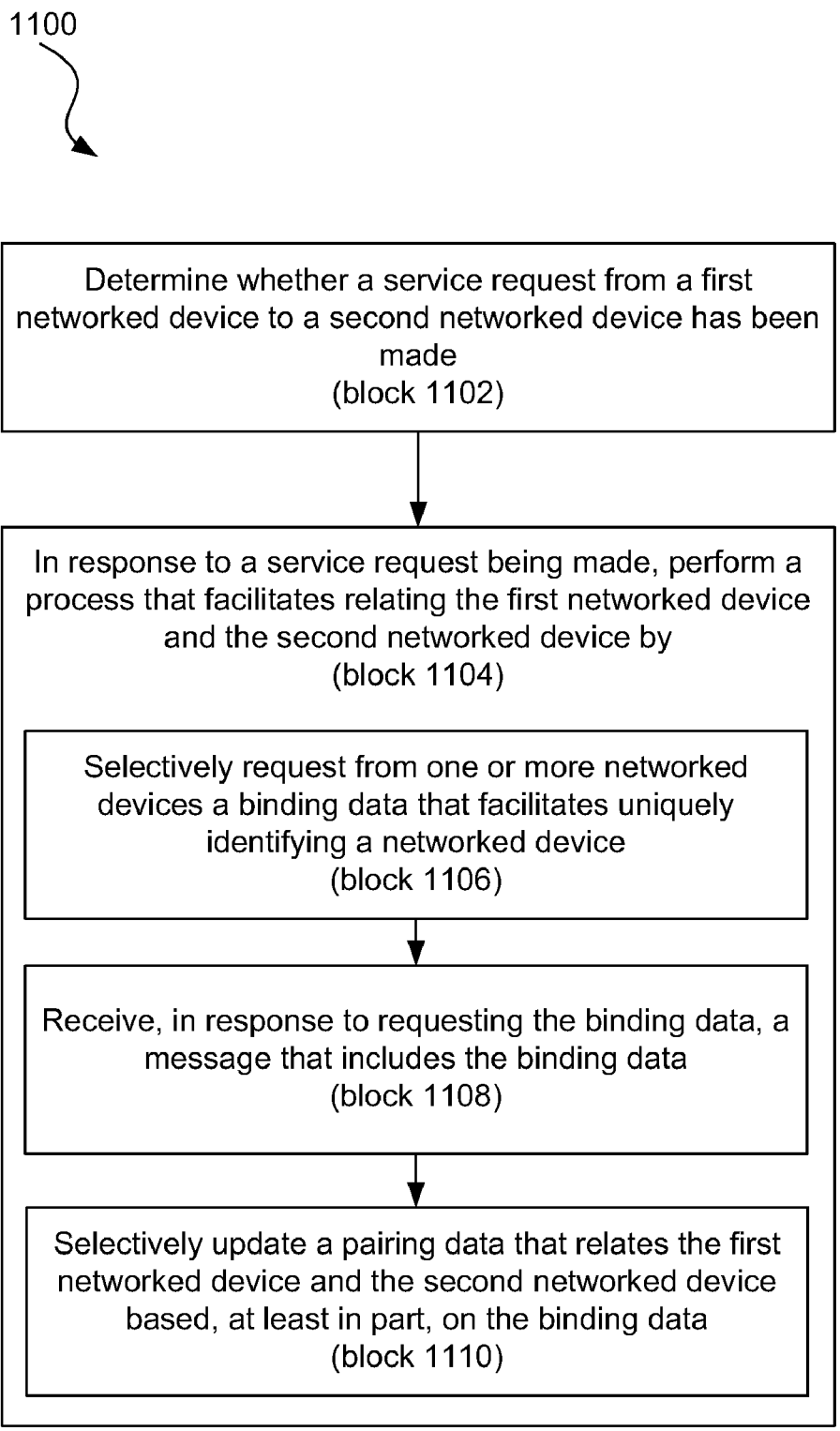
FIG. 11 is a flowchart showing an illustrative method performed by a client-side auto-rediscovery system, according to one example of principles described herein.

FIG. 11 is a flowchart showing an illustrative method (1100) performed by a client-side auto-rediscovery system, according to certain illustrative examples, the method includes determining (block 1102) whether a service request from a first networked device to a second networked device has been made, in response to a service request being made, performing (block 1104) a process that facilitates relating the first networked device and the second networked device by selectively requesting (block 1106) from one or more networked devices a binding data that facilitates uniquely identifying a networked device, receiving (block 1108), in response to requesting the binding data, a message that includes the binding data, and selectively updating (block 1110) a pairing data that relates the first networked device and the second networked device based, at least in part, on the binding data.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A client-side auto-rediscovery system, comprising:
a data store associated with a service requesting networked device configured to store a pairing data that relates said service requesting networked device and a service providing networked device; and
a logic associated with said service requesting networked device configured to, in response to said service requesting device sending a service request to said service providing networked device, determine whether the pairing data should be updated and to update the pairing data if said pairing data is not valid.

2. The system of claim 1, where the data store comprises one or more of, a file, a memory, and a register.

3. The system of claim 2, where the pairing data comprises one or more of, an IP address, a unique hardware identifier, a unique software identifier, a virtual identifier, and a dynamic Identifier.

4. The system of claim 3, where the unique hardware identifier comprises one or more of, a media access control (MAC) address, a globally unique identifier (GUIO), an object identifier (OID), and an IP address.

5. The system of claim 4, where the service requesting networked device comprises one of, a computer, a printer, a scanner, and a server.

6. The system of claim 5, where the service providing networked device comprises one of, a computer, a printer, a scanner, and a server.

7. The system of claim 6, wherein, to determine whether to update said pairing data, the logic is further configured to generate a uni-cast simple network management protocol (SNMP) GET message to be delivered from the service requesting networked device to the service providing networked device and to compare data within a response to said GET message with said pairing data.

8. The system of claim 7, wherein, to update said pairing data, the logic is further configured to selectively generate a multicast SNMP GET message to be delivered to a plurality of service providing networked devices to request a binding data that facilitates updating the pairing data.

9. The system of claim 8, where the binding data comprises one or more of, a MAC address, a GUID, an OID, an IP address, and a virtual name.

10. A client-side auto-rediscovery system, comprising:
a data store configured to store an Internet protocol (IP) address and a MAC address associated with a service providing networked device that is configured to provide a service to a requesting networked device, the data store being located in the requesting networked device;
a first logic configured to, in response to a service request made by said requesting networked device, produce a uni-cast SNMP GET request for the MAC address of the service providing networked device and to determine whether the IP address and MAC address stored in the data store describe a valid pairing based on a uni-cast SNMP GET RESPONSE message, the first logic being located in the requesting networked device; and
a second logic configured to selectively produce a multicast SNMP GET request for the MAC address of one or more service providing networked devices related to said service request and to selectively update the data store based on one or more uni-cast SNMP GET RESPONSE messages responsive to the multicast SNMP GET request, the second logic being located in the requesting networked device.

11. The system of claim 10, where the data store comprises an extensible markup language (XML) file.

12. A client-side auto-rediscovery system, comprising:
means for storing a pairing data that relates a service requesting networked device and a service providing networked device;
means for performing a unicast based discovery between the service requesting networked device and the service providing networked device in response to a service request made from the service requesting networked device to the service providing networked device; and means for selectively performing automatic multicast based discovery to rediscover the service providing networked device based on the unicast based discovery and selectively updating the pairing data based on the multicast based discovery.

13. A client-side auto-rediscovery method, comprising:
determining whether a service request from a first networked device to a second networked device has been made; and
in response to a service request being made, performing a process that facilitates relating the first networked device and the second networked device by:
selectively requesting from one or more networked devices a binding data that facilitates uniquely identifying a networked device;
receiving, in response to requesting the binding data, a message that includes the binding data; and
selectively updating a pairing data that relates the first networked device and the second networked device based, at least in part, on the binding data.

14. The method of claim 13, where determining whether to perform the process is performed periodically.

15. The method of claim 13, wherein said service request is unrelated to said process.

16. The method of claim 13, where determining whether to perform the process includes requesting the binding data from the second networked device via a unicast message.

17. The method of claim 16, where the uni-cast message comprises an SNMP GET request.

18. The method of claim 17, where the binding data comprises one or more of, a MAC address, an OID, a GUID, an IP address, and a virtual name.

19. The method of claim 13, where the binding data is requested in one or more of, a broadcast message, a multicast message, and a uni-cast message.

20. The method of claim 19, where one or more of, the broadcast message, the multicast message, and the uni-cast message comprise one or more of, an SNMP GET request, and an SLP request.

21. The method of claim 20, where the binding data comprises one or more of a MAC address, an OID, a GUID, an IP address, and a virtual name.

22. The method of claim 21, where the binding data is received in a second unicast message.

23. The method of claim 22, where the second uni-cast message comprises one or more of, an SNMP GET RESPONSE message, and an SLP message.

24. The method of claim 13, where the pairing data includes one or more of, an IP address, a MAC address, an OID, a GUID, and a virtual name.

25. The method of claim 13, where the process is performed by a device driver.

26. A non-transitory computer-readable medium providing processor executable instructions operable to perform a client-side auto-rediscovery method, the method comprising:
in response to determining that a service request has been made by a service requesting device;
with the service requesting device, selectively requesting from one or more networked devices a binding data that facilitates uniquely identifying a networked device;
with the service requesting device, receiving, in response to requesting the binding data, a message that includes the binding data;

with the service requesting device, selectively updating a pairing data that relates the first networked device and, the second networked device based, at least in part, on the binding data; and
with the service requesting device, storing the pairing data in a computer memory.

27. The computer-readable medium of claim 26, where the computer-readable medium comprises a compact disk.

28. The computer-readable medium of claim 26, where the computer-readable medium comprises a memory.

29. A client-side auto-rediscovery method, comprising:
determining, in response to a service request made from a first networked device to a second networked device, whether to perform a process on behalf of said first networked device by requesting a MAC address from said second networked device, where the MAC address facilitates binding the first networked device and the second networked device;
selectively requesting a MAC address from one or more networked devices, where the MAC address facilitates re-binding the first networked device and the second networked device, where the request is transmitted in an SNMP GET message via one or more of a multicast and broadcast mode;
receiving the MAC address in a uni-cast SNMP GET RESPONSE message; and
selectively updating an IP address, MAC address pair stored on the first networked device to bind the first networked device and the second networked device.

30. A client-side auto-rediscovery method, comprising:
discovering a first connection to a service providing networked device;
client-side associating a stored connection between a service requesting networked device and the service providing networked device based, at least in part, on the first connection;
upon the service requesting networked device making a request for a service from the service providing networked device, validating the stored connection;
selectively re-discovering a second connection to the service providing networked device; and
selectively client-side re-associating the stored connection based, at least in part, on the second connection.

31. The method of claim 30, where discovering the first connection comprises sending one or more of, a broadcast message and a multicast message by one or more of, an SNMP message and an SLP message to one or more service providing networked devices.

32. The method of claim 31, where client-side associating the stored connection comprises storing one or more of, a unique hardware identifier, a unique software identifier, a virtual identifier, a dynamic identifier, and a uni-cast IP address associated with the service providing networked device.

33. The method of claim 32, where validating the stored connection to the service providing networked device comprises sending a uni-cast SNMP GET message to the service providing networked device.

34. The method of claim 33, where selectively re-discovering the second connection comprises sending one or more of, a broadcast message and a multicast message by one or more of, an SNMP message and an SLP message to one or more service providing networked devices.

35. The method of claim 34, where client-side re-associating the stored connection comprises updating a pairing table.

* * * * *

UNITED STATES PATENT AND TRADEMARK OFFICE
CERTIFICATE OF CORRECTION

PATENT NO. : 8,204,978 B2  
APPLICATION NO. : 10/774934  
DATED : June 19, 2012  
INVENTOR(S) : Peter Parks et al.

Page 1 of 1

It is certified that error appears in the above-identified patent and that said Letters Patent is hereby corrected as shown below:

In column 12, line 15, in Claim 4, delete "(GUIO)," and insert -- (GUID), --, therefor.

Signed and Sealed this
Eighth Day of January, 2013

David J. Kappos
*Director of the United States Patent and Trademark Office*